United States Patent [19]

Wong

[11] Patent Number: 4,523,137
[45] Date of Patent: Jun. 11, 1985

[54] DUAL MODE PRINTER SERVO WITH IMPROVED VELOCITY SIGNAL GENERATOR

[75] Inventor: Harvey C. Wong, Kensington, Calif.

[73] Assignee: Mechatron Systems, Inc., Sunnyvale, Calif.

[21] Appl. No.: 536,551

[22] Filed: Sep. 27, 1983

[51] Int. Cl.³ .............................................. G05B 19/30
[52] U.S. Cl. .................................... 318/604; 318/592; 318/618
[58] Field of Search .............. 318/592, 594, 619, 561, 318/590, 604, 618

[56] References Cited

U.S. PATENT DOCUMENTS

| | | | |
|---|---|---|---|
| 3,721,882 | 3/1973 | Helms | 318/594 X |
| 4,245,298 | 1/1981 | Slater | 318/604 X |
| 4,446,408 | 5/1984 | Ebermann et al. | 318/604 X |
| 4,469,993 | 9/1984 | Swanson et al. | 318/561 X |
| 4,473,786 | 9/1984 | Miyashita et al. | 318/602 X |
| 4,484,118 | 11/1984 | Manabe et al. | 318/561 |

Primary Examiner—B. Dobeck
Attorney, Agent, or Firm—Townsend and Townsend

[57] ABSTRACT

In a dual mode servo for a rotary printer control system for controlling the velocity and position of a rotary print wheel and a print wheel carriage, the analog counterpart of a digital desired velocity multibit character is generated by a bidirectional digital to analog converter so that the analog desired velocity signal has a maximum value range lying both above and below a zero reference level, thereby eliminating the need for additional analog level converting circuitry.

7 Claims, 3 Drawing Figures

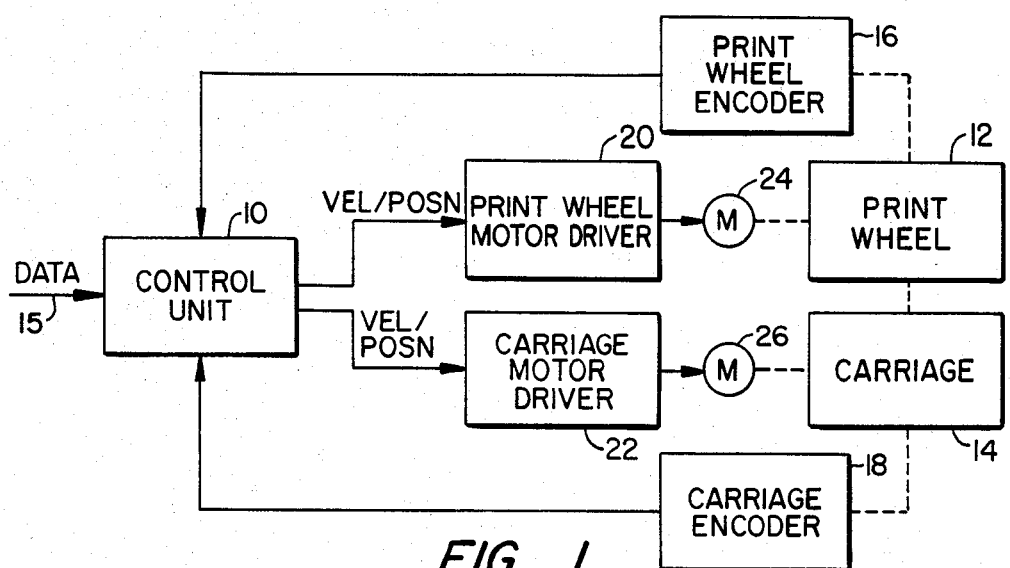
FIG._1.
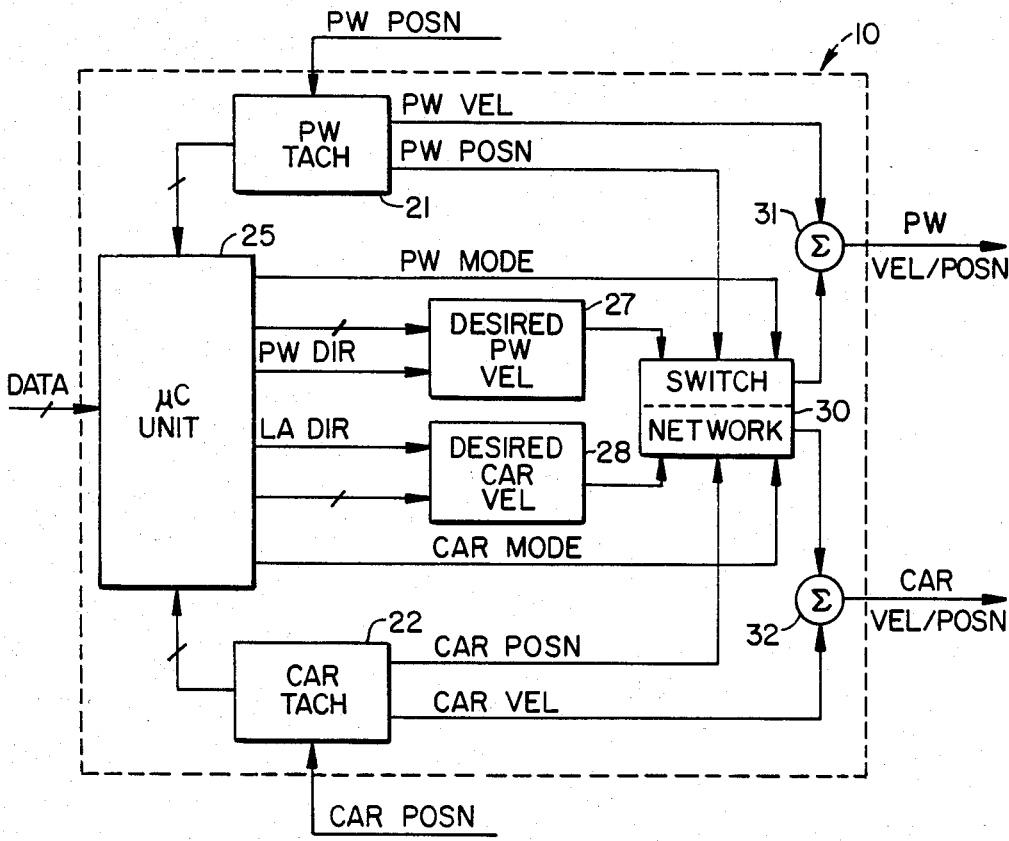
FIG._2.

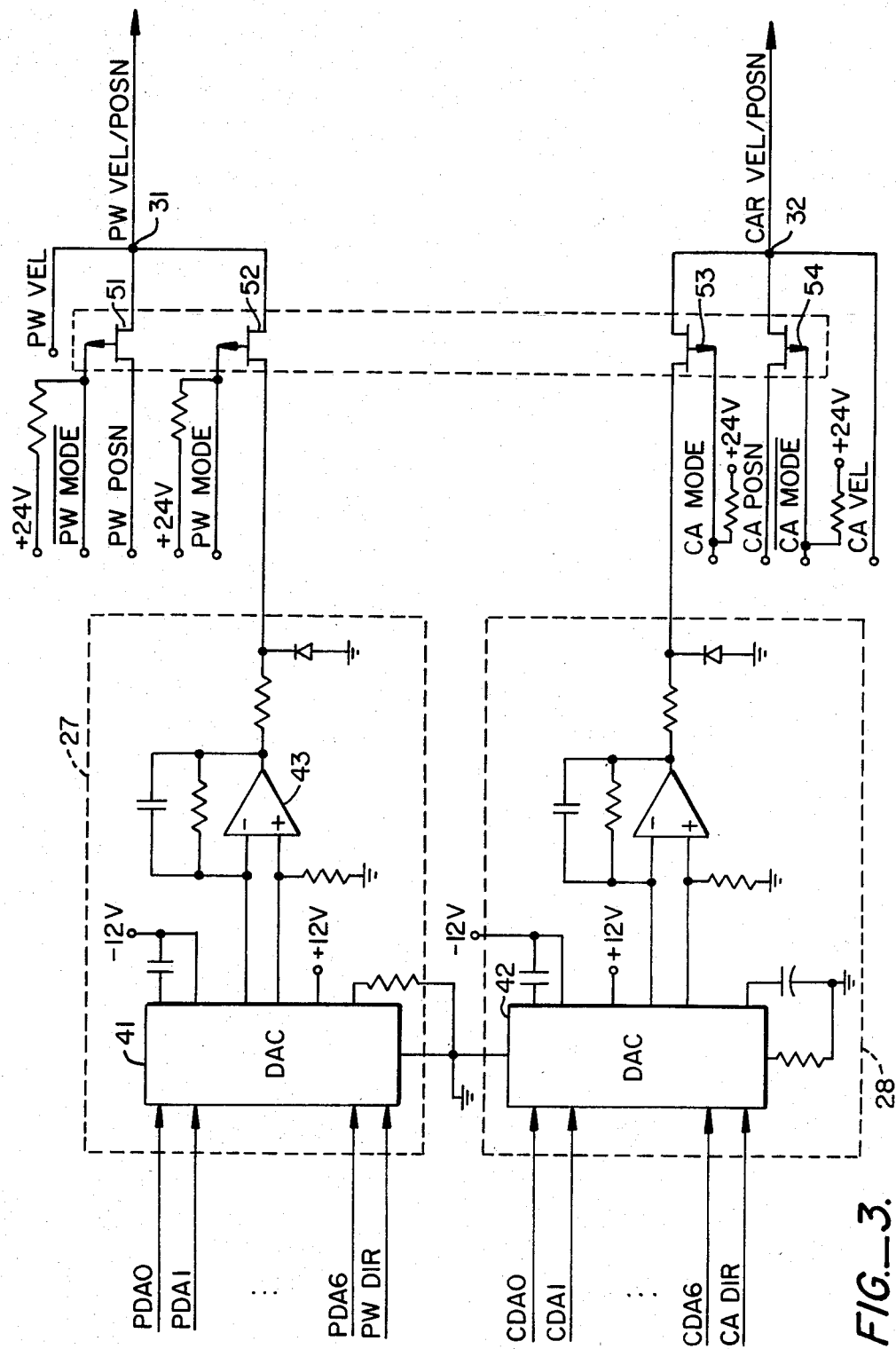
FIG._3.

DUAL MODE PRINTER SERVO WITH IMPROVED VELOCITY SIGNAL GENERATOR

BACKGROUND OF THE INVENTION

This invention relates to servo control systems for use in electromechanical devices of the type employing a rotary print wheel, sometimes termed a "daisy wheel printer", wherein the print wheel is both rotated and translated by a pair of motors under control of an electronic control system. More particularly, this invention relates to an improved desired velocity signal generation technique for such servo control systems.

Rotary printing systems having servo control are known in which the rotary print wheel is mounted on a carriage for translation across the width of the print throat area during printing. The carriage is typically translated in right and left directions through a series of cables and pulleys driven incrementally by a DC motor controlled by a suitable electronic control system. As the carriage-wheel assembly is translated from character position to character position along the print line, the print wheel is rotated so that the character pad bearing the next character to be printed is aligned with the striking end of a print hammer, also mounted on the carriage, when the carriage is momentarily decelerated to a rest position. When the carriage has reached the rest condition, the print hammer is actuated to impress the character borne by the pad against an inking ribbon and the face of the printing media to print that character. After the print hammer rebounds, the carriage is translated to the next character location, the print wheel is rotated so that the proper character pad is aligned with the print hammer, and the next character is printed. This process continues until a complete line has been so printed, after which the carriage motion is reversed to print the next line of characters in reverse order, or the carriage is returned to the left-most starting position in preparation for printing the next line of characters.

Proper operation of such rotary printing systems requires an accurate servo control system for both the print wheel and the carriage. The servo system most typically used is a dual mode system having a velocity mode and a position mode. In the velocity mode, the velocity of the controlled element (i.e., print wheel or carriage) is controlled in accordance with a pre-selected velocity profile to ensure optimum initial acceleration to a maximum design velocity value, followed by stepped deceleration until the desired linear or rotary position is achieved. Once this position (frequently termed the HOME position) has been reached, the servo is switched to a position mode of operation in which the linear or angular position of the controlled element is maintained substantially constant. In both modes of operation, position feedback signals generated by a position encoder associated to the controlled element (typically an optical encoder for generating sinusoidal position signals) are used to provide the necessary feedback information specifying the instantaneous position of the controlled element. These signals, either in their pure sinusoidal form or in logically processed pulse form, are coupled to a control unit in which the position information is used to determine certain key parameters, such as direction of print wheel rotation, incremental linear or angular distance from the present position to the next desired position, actual velocity of the controlled element, required incremental velocity, and the like. In addition, the control unit supervises the operating mode of each servo system, i.e., whether velocity or position mode, and generates the necessary servo control signals for switching the operation between the two distinct modes. In addition, when in the position mode the servo system uses one of the analog position feedback signals to monitor excursions of the controlled element away from the desired HOME position in order to generate corrective position signals to the motor driving the controlled element in order to counteract any such deviations.

Critical to the proper operation of dual mode servo systems used in rotary printing systems is the manner in which the velocity control signals are generated when the servo is operated in the velocity mode. Typically, the preselected velocity profile used to establish the desired optimum motion of the controlled element is stored in the form of digital characters of prescribed value in a read only memory (ROM) arranged as a velocity lookup table. Depending on the present angular or linear distance of the controlled element from the required printing position specified by the text information supplied to the control unit, a given digital desired velocity character is accessed from the ROM and coupled to a digital to analog converter (DAC), and the digital multibit character is converted to a corresponding analog signal. This analog signal is then typically compared with a corresponding analog signal representing the actual velocity of the controlled element in order to generate a correction signal, which is supplied to the motor driver and used to control the amount of current supplied to the driving motor for the corresponding controlled element. In known systems, the DAC is a unidirectional or unipolar DAC which generates a unidirectional analog output current which varies in magnitude over a prescribed range, but which is incapable of bidirectional flow. Since the correction signal must be capable of specifying not only magnitude but also direction (i.e., clockwise or counterclockwise for the print wheel and left-to-right or right-to-left for the carriage), the unidirectional analog current output of the DAC must be further processed to provide a bidirectional range of values in order to provide the requisite range of control. This is usually accomplished by providing a range converter circuit between the output of the DAC and the summing junction for the two signals. Since the range converter circuitry is necessarily composed of analog elements, such as a plurality of resistors and an operational amplifier, static errors are introduced into the analog desired velocity signal by virtue of the normal variation of analog parameters in the elements employed. While the introduced error can be somewhat mitigated by using high precision components, this error cannot be eliminated altogether. This problem is exacerbated by the fact that the parametric values of the analog components change with temperature, humidity and time, so that dynamic errors, as well as static errors, change the absolute value of the desired analog velocity signal in an undesirable, and frequently unpredictable, way.

SUMMARY OF THE INVENTION

The invention comprises an improvement to a dual mode servo control system for a rotary printing system which minimizes the disadvantage of both static and dynamic errors in the circuitry for generating the analog desired velocity signals, which reduces the total number of analog components and which is highly reliable in operation.

From a system standpoint, in a first aspect the invention comprises an improvement in a dual mode servo incorporated in a rotary printer system having a controlled element selected from the group consisting of a rotary print wheel and a translatable print wheel carriage, a motor for driving the controlled element, a motor driver for providing driving signals for the motor, an encoder for generating position signals corresponding to actual movement of the controlled element, and a control unit for furnishing correction signals to the motor driver, the control unit including means for generating analog desired velocity signals from predetermined digital desired velocity signals and analog actual velocity signals from the encoder position signals, and means for algebraically summing the analog desired velocity signals and the analog actual velocity signals; the improvement comprising means for generating bidirectional analog desired velocity signals having a maximum value range lying both above and below a zero polarity level. The bidirectional analog desired velocity signal generating means preferably comprises a bidirectional digital to analog converter having a plurality of digital signal input terminals for receiving the digital desired velocity signals, and an output terminal for manifesting the corresponding bidirectional analog desired velocity signals.

In a more limited system aspect, the invention comprises a servo control unit for a rotary printer system having a rotary print wheel, a translatable carriage, a pair of motors for driving the print wheel and the carriage, a pair of motor drivers for supplying variable drive current to the motors, and a pair of position encoders for generating position feedback signals representative of the actual motion of the print wheel and the carriage, the servo control unit comprising tachometer means responsive to the position feedback signals for generating analog velocity signals representative of the actual velocity of the print wheel, means for generating a digital velocity character representative of the desired velocity of the print wheel, bidirectional digital to analog converter means having input terminal means coupled to the digital velocity character generating means for generating bidirectional analog desired velocity signals having a maximum value range disposed substantially about a zero value, and summing means for summing the output of the tachometer means and the bidirectional digital to analog converter means to generate a control signal for the print wheel motor driver.

In a further limited system aspect, the invention comprises a servo control unit for a rotary printer system having a rotary print wheel, a translatable carriage, a pair of motors for driving the print wheel and the carriage, a pair of motor drivers for supplying variable drive current to the motors, and a pair of position encoders for generating position feedback signals representative of actual motion of the print wheel and carriage, the servo control unit comprising tachometer means responsive to the position feedback signals for generating analog velocity signals representative of the actual velocity of the carriage, means for generating a digital velocity character representative of the desired velocity of the carriage, bidirectional digital to analog converter means having input terminal means coupled to the digital velocity character generating means for generating bidirectional analog desired velocity signals having a maximum value range disposed substantially symmetrically about a zero value, and summing means for summing the output of the tachometer means and the bidirectional digital to analog converter means to generate a control signal for the carriage motor driver.

In a still further limited system aspect, the invention comprises a servo control unit for a rotary printer system having a rotary print wheel, a translatable carriage, first and second motors for driving the print wheel and the carriage respectively, first and second motor drivers for supplying variable drive current to the first and second motors respectively, and first and second position encoders for generating position feedback signals representative of the actual motion of the print wheel and carriage respectively, the servo control unit comprising first tachometer means responsive to the position feedback signals from the first position encoder for generating analog velocity signals representative of the actual velocity of the print wheel, second tachometer means responsive to the position feedback signals from the second position encoder for generating analog velocity signals representative of the actual velocity of the carriage, means for generating a first digital velocity character representative of the desired velocity of the print wheel and a second digital velocity character representative of the desired velocity of the carriage, first bidirectional digital to analog converter means having input terminal means coupled to said digital velocity character generating means for generating bidirectional analog desired print wheel velocity signals having a maximum value range disposed substantially symmetrically about a zero value, second bidirectional digital to analog converter means having input terminal means coupled to said digital velocity character means for generating bidirectional analog desired carriage velocity signals having a maximum value range disposed substantially symmetrically about a zero value, first summing means for summing the output of the first tachometer means and the first bidirectional digital to analog converter means to generate a control signal for the print wheel motor driver, and second summing means for summing the output of the second tachometer means and the second bidirectional digital to analog converter means to generate a control signal for the carriage motor driver.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic block diagram of a rotary printer system incorporating the invention;

FIG. 2 is a more detailed block diagram showing portions of the control unit of FIG. 1 in more detail; and FIG. 3 is a logic diagram illustrating a preferred embodiment of the invention.

DESCRIPTION OF THE PREFERRED EMBODIMENT

Turning now to the drawings, FIG. 1 illustrates in schematic block diagram form, a rotary printer system embodying the invention. As seen in this Figure, a control unit 10 for a rotary print wheel, schematically depicted as element 12, and a print wheel and hammer carriage, schematically depicted as element 14, receives data signals via a data input line 15, specifying the text content to be printed.

The source of such data on input conductor 15 may be a typewriter keyboard, an associated word processing computer, a remote computer or the like.

Control unit 10 also receives position signals from a print wheel encoder 16 and a carriage encoder 18 which are linked, respectively, to the print wheel 12 and the carriage 14 by any suitable means. Typically, optical encoders of a known type are employed, which generate one or more sinusoidal or quasi-sinusoidal analog electrical position signals in response to rotational movement of print wheel 12 and linear movement of carriage 14. Suitable encoders are well-known to those skilled in the art.

The position signals fed back from the respective controlled elements (i.e., print wheel 12 and carriage 14) from the corresponding encoders 16 and 18, may comprise either the sinusoidal position signals or logically processed binary pulse trains corresponding to the sinusoidal or quasi-sinusoidal position signal trains.

As illustrated more fully in FIG. 2 and described below, control unit 10 contains the necessary electronic sub-units required to generate from the input data signals on conductor 15 and the position feedback signals, the conventional control signals used to operate a print wheel motor driver 20 and a carriage motor driver 22, each of which units provides the necessary driving current to the associated print wheel motor 24 and carriage motor 26. Motor 24 is mechanically linked to print wheel 12, while carriage motor 26 is mechanically linked to translatable carriage 14, as suggested by the broken line connections therebetween. Control unit 10 preferably incorporates a type 8031 microprocessor available from Intel Corporation of Santa Clara, Calif.

The print wheel motor driver 20 and carriage motor driver 22 are similar units which generate, in response to input velocity/position control signals, appropriate driving currents for their respective associated motors 24 and 26, so that the print wheel 12 and carriage 14 are respectively rotated and translated at the proper design velocities and in the proper direction (when the servo is operated in the velocity mode), and maintained in a relatively stationary position when the HOME position is achieved (when the servo is operated in the position mode).

In operation, when control unit 10 senses newly presented data requiring motion of either the print wheel 12, the carriage 14, or both, the corresponding servo loop is switched to the velocity mode of operation. During this mode of operation, the control unit 10 generates velocity control signals for the corresponding driver unit 20, 22. The driver units 20, 22 provide the proper current to the corresponding motors 24, 26 in order to ensure motion of the associated controlled element 12, 14 in accordance with a preselected velocity profile. During motion of each controlled unit 12, 14, the feedback position signals from the corresponding encoder units 16, 18 provide actual position signals to the control unit 10, which uses these signals to monitor the progress of the controlled units 12, 14 and the velocities thereof. As each controlled unit 12, 14 approaches its proper destination, the velocity signals generated by control unit 10 are correspondingly changed in accordance with the preselected velocity profile until the controlled unit 12, 14 is close to the HOME position. At this point, control unit 10 switches the servo operation to the position mode in which the feedback position signals are used to control any excursions of the corresponding controlled element 12, 14 away from the HOME position.

With reference to FIG. 2, the major subunits comprising control unit 10 are illustrated in greater detail. As scene in this Figure, the print wheel position signals from the print wheel encoder are coupled as data inputs to a print wheel tachometer 21, while the carriage position signals are coupled as inputs to a carriage tachometer 22. The print wheel tachometer processes the print wheel analog position signals into binary pulse trains which are coupled as data inputs to a microcomputer unit 25. Similarly, the carriage tachometer unit processes the carriage position analog signals into binary pulse trains that are coupled as data inputs to microcomputer unit 25. The microcomputer unit 25, which preferably includes a type 8031 microprocessor available from Intel Corporation of Santa Clara, Calif., uses the binary pulse trains, which are representative of actual motion of the print wheel 12 and carriage 14 to compute the actual position of these controlled elements. This information is used to monitor the angular or linear separation distance of the controlled elements from the desired angular or linear positions when the microcomputer contains data requiring the movement of the print wheel and/or carriage to a new position. One such specific use of this position information is to perform a table lookup of a desired velocity from a set of velocity profiles stored in the read only memory (ROM) portion of microcomputer unit 25, and each desired velocity is coupled as a multibit character to the proper one of two desired velocity units 27, 28. Desired print wheel velocity unit 27 converts the multibit digital desired velocity character to an analog counterpart, while desired carriage velocity unit 28 performs the same function for the desired carriage velocity. The analog counterparts of the desired velocity signals produced by units 27, 28 are coupled as inputs to a switch network 30, along with an actual analog print wheel position signal from print wheel tachometer 21 and an actual carriage position signal from carriage tachometer 22. The remaining inputs to switch network 30 are mode control signals, termed PW mode and CAR mode, which control the mode of operation of switch network 30. In one mode, termed velocity mode, the analog desired velocity signals are passed through switch network 30, while in the alternate mode of operation, termed position mode, the position signals are passed through switch network 30. As conceptually indicated by the horizontal broken line, switch network 30 is divided into two halves: a print wheel half and a carriage half, and each half may operate independently of the other, so that the alternate desired print wheel velocity and print wheel position analog signals may be selectively passed through switch network 30 in an alternate fashion, and the analog carriage desired velocity signal and carriage position signal may also be alternately passed through switch network 30, the two pairs of signals being alternately selected by the mode position signals.

The appropriate print wheel analog signal is coupled to a first summing junction 31 where it is algebraically combined with a print wheel actual velocity signal produced by print wheel tachometer 21. Similarly, the appropriate analog carriage signal is coupled to a second summing junction 32 where it is algebraically combined with the actual carriage analog velocity signal produced by carriage tachometer 22. The output of summing junction 31 comprises the control signal used to operate the print wheel motor driver 20, while the output signal from summing junction 32 comprises the control signal for the carriage motor driver 22.

FIG. 3 illustrates the logical configuration of the desired print wheel velocity unit 27 and the desired carriage velocity unit 28, each unit being outlined in broken lines bearing the same reference numeral. As seen in this Figure, the heart of each unit is a bidirectional digital to analog converter: specifically, converter 41 for the desired print wheel velocity unit 27 and converter 42 for the desired carriage velocity unit 28. The digital inputs to converter 41 are the seven bit desired velocity digital characters supplied from microcomputer unit 25 and a control signal termed PWDIR, which specifies the direction of rotation (i.e., clockwise or counterclockwise). The bidirectional analog desired velocity output current signal from converter 41 is coupled through an operational amplifier circuit 43 to a first transfer input of a FET switch 52. The transfer output terminal of FET 52 is coupled to the summing junction 31. The PW mode signal is coupled to the control terminal of FET switch 52 and renders the switch conductive whenever the signal is at a relatively low logic level.

The print wheel position signal from print wheel tachometer 21 is coupled to a transfer input of a FET switch 51, the transfer output terminal of which is also coupled to summing junction 31. The inverse of the PW mode control signal is coupled to the control terminal of FET switch 51 so that switches 51, 52 are alternately conductive and nonconductive on a mutually exclusive basis.

The structure and function of the desired carriage velocity unit 28 is identical in operation to that described above for the desired print wheel velocity unit 27, with the exception of the specific control signals and the input digital data. The digital inputs to converter 42 comprise a seven bit digital character specifying the magnitude of the desired velocity for the carriage, and a control signal termed CADIR, which specifies the direction of translation of the carriage.

As will now be apparent, the desired velocity units fabricated according to the teachings of the invention require only a minimal number of components in addition to the digital to analog converters in order to provide reliable analog versions of the digital desired velocity signals used in the rotary printer servo control unit. Due to a reduction in the total number of analog components required, a corresponding reduction in both static errors caused by deviations in the parametric values from the design values and dynamic noise caused by drift in the component values in response to changing temperature and humidity conditions, as well as time, are minimized.

While the above provides a full and complete disclosure of the invention, various modifications, alternate constructions and equivalents may be employed without departing from the spirit and scope of the invention. Therefore, the above should not be construed as limiting the invention, which is defined by the appended claims.

What is claimed is:

1. A method of operating a servo in a rotary printer system having a controlled element selected from the group consisting of a rotary print wheel and a translatable print wheel carriage, a motor for driving the controlled element, a motor driver for providing driving signals for the motor, an encoder for generating position signals corresponding to actual movement of the controlled element, and a control unit for furnishing correction signals to the motor driver, the control unit including means for generating analog desired velocity signals from predetermined digital desired velocity signals and analog actual velocity signals from the encoder position signals, and means for algebraically summing the analog desired velocity signals and the analog actual velocity signals, said method comprising the steps of generating bidirectional analog desired velocity signals having a maximum value range lying both above and below a zero reference level, and summing said bidirectional analog desired velocity signals with the analog actual velocity signals to generate the motor driver correction signals.

2. The method of claim 1 wherein the analog actual velocity signals have a maximum value range substantially coextensive with the range of said bidirectional analog desired velocity signals.

3. In a servo incorporated in a rotary printer system having a controlled element selected from the group consisting of a rotary print wheel and a translatable print wheel carriage, a motor for driving the controlled element, a motor driver for providing driving signals for the motor, an encoder for generating position signals corresponding to actual movement of the controlled element, and a controlled unit furnishing correction signals to the motor driver, the controlled unit including means for generating analog desired velocity signals from predetermined digital desired velocity signals and analog actual velocity signals from the encoder position signals, and means for algebraically summing the analog desired velocity signals and the analog actual velocity signals; the improvement wherein said means for generating analog desired velocity signals comprises means for generating bidirectional analog desired velocity signals having a maximum value range lying both above and below a zero reference level.

4. The invention of claim 3 wherein said bidirectional analog desired velocity signal generating means comprises a bidirectional digital to analog converter having a plurality of digital signal input terminals for receiving said digital desired velocity signals, and an output terminal for manifesting said bidirectional analog desired velocity signals.

5. A servo control unit for a rotary printer system having a rotary print wheel, a translatable carriage, a pair of motors for driving the print wheel and carriage, a pair of motor drivers for supplying variable drive current to the motors, and a pair of position encoders for generating position feedback signals representative of the actual motion of the print wheel and the carriage, said servo control unit comprising:
   tachometer means responsive to the position feedback signals for generating analog velocity signals representative of the actual velocity of the print wheel;
   means for generating a digital velocity character representative of the desired velocity of the print wheel;
   bidirectional digital to analog converter means having input terminal means coupled to said digital velocity character generating means for generating bidirectional analog desired velocity signals having a maximum value range disposed substantially symmetrically about a zero amplitude value; and
   summing means for summing the output of said tachometer means and said bidirectional digital to analog converter means to generate a control signal for the print wheel motor driver.

6. A servo control unit for a rotary printer system having a rotary print wheel, a translatable carriage, a pair of motors for driving the print wheel and the carriage, a pair of motor drivers for supplying variable drive current to the motors, and a pair of position encoders for generating position feedback signals representative of the actual motion of the print wheel and the carriage, said servo control unit comprising:
- tachometer means responsive to the position feedback signals for generating analog velocity signals representative of the actual velocity of the carriage;
- means for generating a digital velocity character representative of the desired velocity of the carriage;
- bidirectional digital to analog converter means having input terminal means coupled to said digital velocity character generating means for generating bidirectional analog desired velocity signals having a maximum value range disposed substantially symmetrically about a zero amplitude value; and
- summing means for summing the output of said tachometer means and said bidirectional digital to analog converter means to generate a control signal for the carriage motor driver.

7. A servo control unit for a rotary printer system having a rotary print wheel, a translatable carriage, first and second motors for driving the print wheel and the carriage respectively, first and second motor drivers for supplying variable drive current to the first and second motors respectively, and first and second position encoders for generating position feedback signals representative of the actual motion of the print wheel and the carriage respectively, said servo control unit comprising:
- first tachometer means responsive to the position feedback signals from said first position encoder for generating analog velocity signals representative of the actual velocity of the print wheel;
- second tachometer means responsive to the position feedback signals from said second position encoder for generating analog velocity signals representative of the actual velocity of the carriage;
- first means for generating a digital velocity character representative of the desired velocity of the print wheel;
- second means for generating a digital velocity character representative of the desired velocity of the carriage;
- first bidirectional digital to analog converter means having input terminal means coupled to said first digital velocity character generating means for generating bidirectional analog desired print wheel velocity signals having a maximum value range disposed substantially symmetrically about a zero amplitude value;
- second bidirectional digital to analog converter means having input terminal means coupled to said second digital velocity character generating means for generating bidirectional analog desired carriage velocity signals having a maximum value range disposed substantially symmetrically about a zero amplitude value;
- first summing means for summing the output of said first tachometer means and said first bidirectional digital to analog converter means to generate a control signal for the print wheel motor driver; and
- second summing means for summing the output of said second tachometer means and said second bidirectional digital to analog converter means to generate a control signal for the carriage motor driver.

* * * * *